United States Patent
Meyer

(10) Patent No.: US 7,270,486 B2
(45) Date of Patent: Sep. 18, 2007

(54) OPTICAL SIGNAL COUPLING

(75) Inventor: Martin Wolfgang Meyer, Birkenfeld-Gräfenhausen (DE)

(73) Assignee: era-contact GmbH, Bretten (DE)

( * ) Notice: Subject to any disclaimer, the term of this patent is extended or adjusted under 35 U.S.C. 154(b) by 244 days.

(21) Appl. No.: 10/694,072

(22) Filed: Oct. 27, 2003

(65) Prior Publication Data

US 2004/0175068 A1   Sep. 9, 2004

(30) Foreign Application Priority Data

Mar. 7, 2003   (DE) ................. 103 10 134

(51) Int. Cl.
G02B 6/38   (2006.01)
G02B 6/42   (2006.01)
B60R 11/00  (2006.01)

(52) U.S. Cl. .................. 385/75; 285/25; 340/430
(58) Field of Classification Search ............ 385/25–26, 385/75, 92, 147; 174/70 R; 340/430
See application file for complete search history.

(56) References Cited

U.S. PATENT DOCUMENTS

| 3,809,908 A | 5/1974 | Clanton |
| 5,475,215 A | 12/1995 | Hsu |
| 5,857,042 A | 1/1999 | Robertson et al. |
| 5,917,632 A | 6/1999 | Lesesky |
| 6,883,973 B2 * | 4/2005 | Meyer ................. 385/70 |

FOREIGN PATENT DOCUMENTS

| DE | 29 22 937 C2 | 7/1981 |
| DE | 28 54 962 C2 | 9/1986 |
| DE | 100 32 542 A1 | 1/2002 |
| DE | 100 52 020 A1 | 5/2002 |
| EP | 0 395 607 | 10/1990 |
| EP | 0 463 390 B1 | 11/1997 |
| FR | 2 691 265 | 11/1993 |

* cited by examiner

Primary Examiner—Kevin S Wood
Assistant Examiner—Jerry T. Rahll
(74) Attorney, Agent, or Firm—McCormick, Paulding & Huber LLP

(57) ABSTRACT

Described are an optical signal coupling for two vehicles coupled with one another and a conductive coupling which contains such a signal coupling. The signal coupling has a first and a second coupling part each of which is carried by a respective one of the vehicles and between which the optical signals are transmitted. The first coupling part contains a sending device which creates the optical signals to be transmitted, and the second coupling part contains a receiving device which detects the transmitted optical signals.

21 Claims, 5 Drawing Sheets

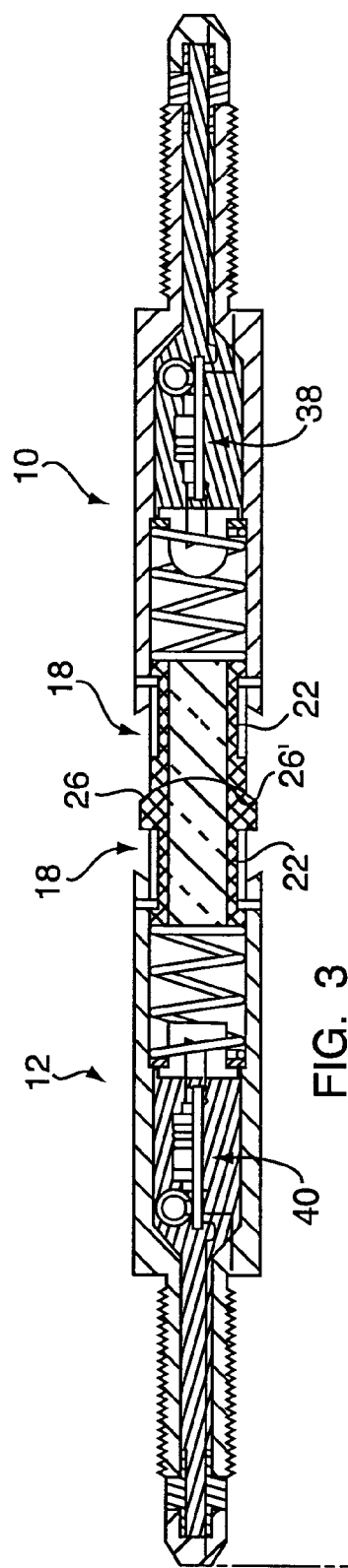
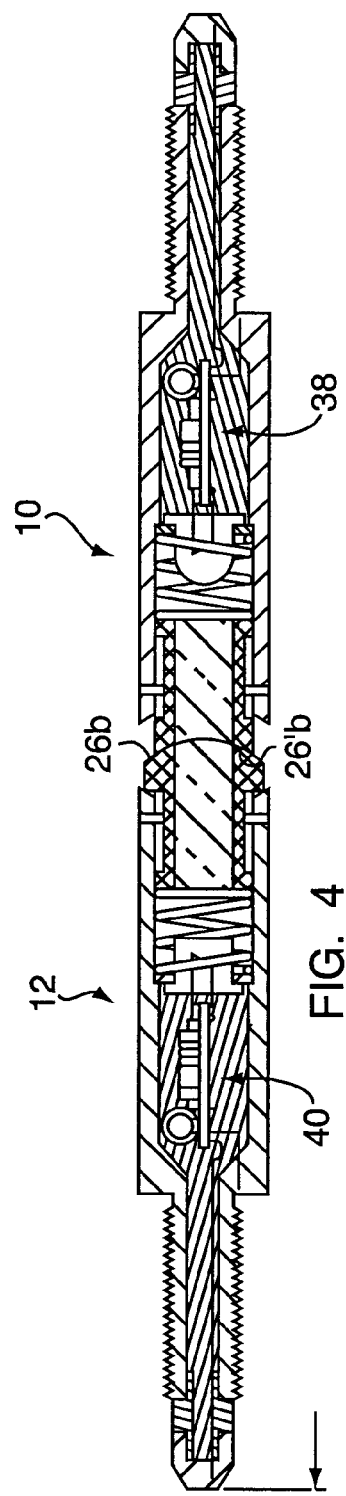
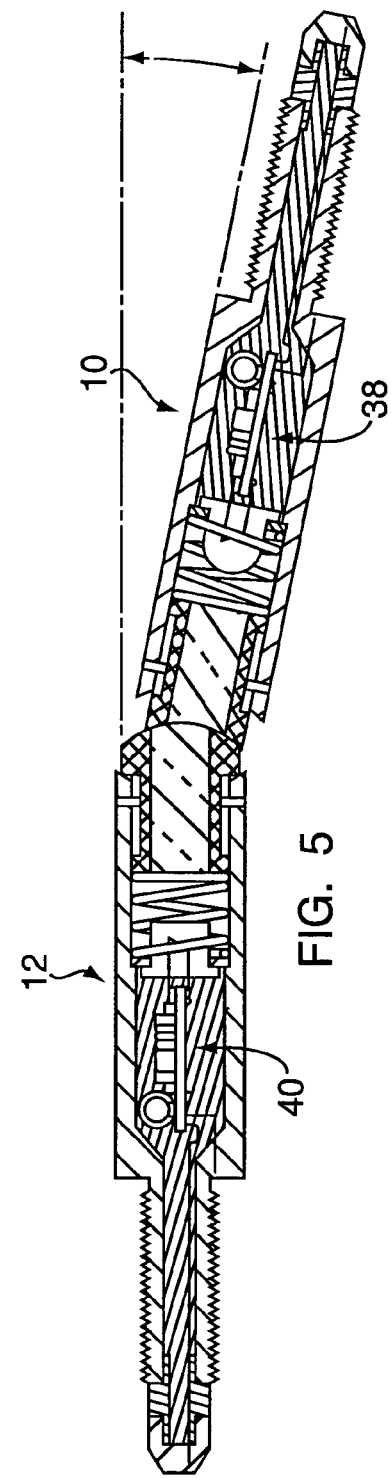
FIG. 3
FIG. 4
FIG. 5

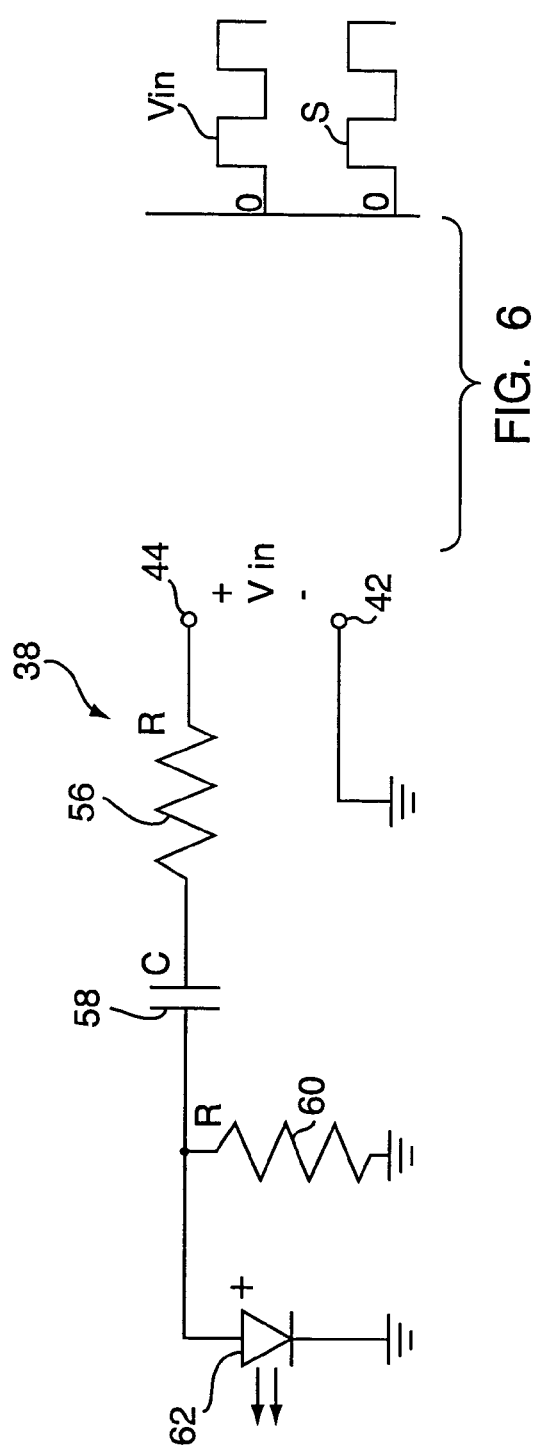
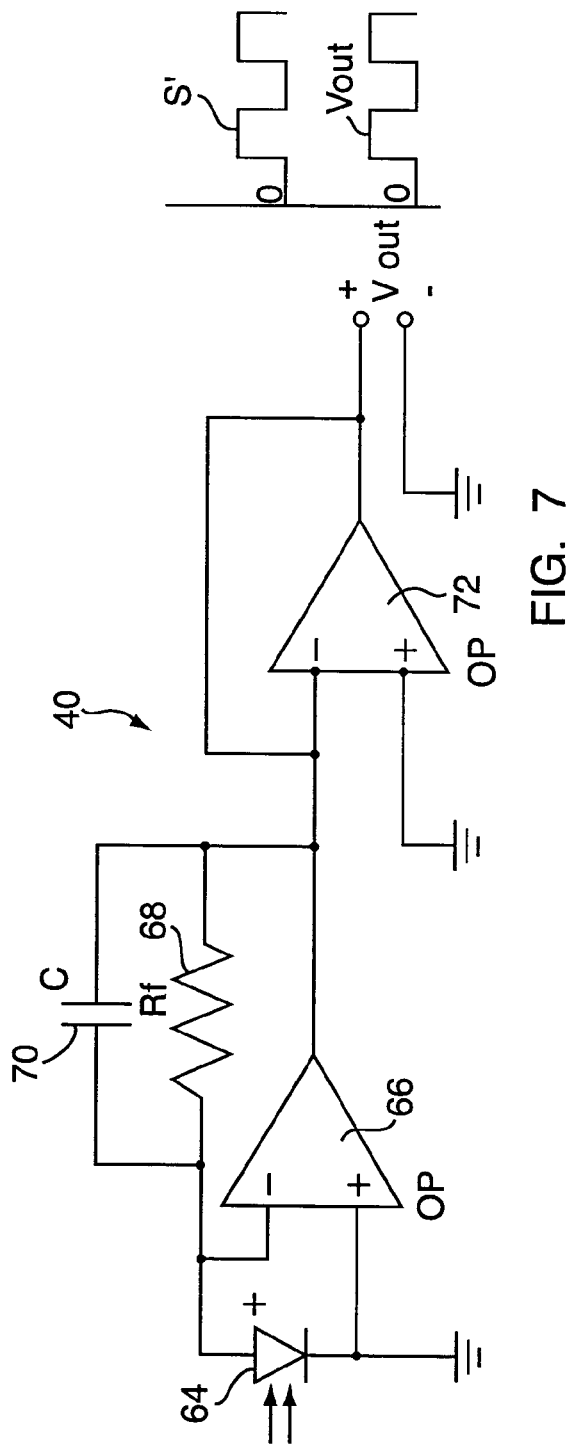
FIG. 6
FIG. 7

OPTICAL SIGNAL COUPLING

CROSS-REFERENCE TO RELATED APPLICATIONS

This application is entitled to the benefit of and incorporates by reference essential subject matter disclosed in German Patent Application No. 103 10 134.9 filed on Mar. 7, 2003.

FIELD OF THE INVENTION

The present invention concerns an optical signal coupling for two vehicles coupled with one another, especially rail vehicles coupled with one another, with a first coupling part carried by one of the vehicles and a second coupling part carried by the other of the vehicles, between which parts optical signals are transmitted. The invention further concerns a conductive coupling for rail vehicles, which coupling contains at least one of such signal couplings.

BACKGROUND OF THE INVENTION

In vehicle technology for signal and data transmission, light conductors are becoming used in increasing numbers which, in contrast to a customary electrical signal conductors, provide substantial advantages. Among these advantages are their larger transmission bandwidths and their similarly small susceptibility in respect to electromagnetic disturbance fields. Optical signal couplings of the above mentioned kind are necessary if signals are to be transmitted not only within a vehicle but also between two vehicles coupled with one another, such as for example the cars of a vehicle train.

An optical signal coupling of the above mentioned kind is for example known from DE 28 54 962 C2, in which an intermediate buffer coupling for rail vehicles is described. A conductive coupling belongs to the intermediate buffer coupling which among other things serves to transmit impulses for the control of the braking and driving currents in a train of vehicles from one vehicle to the other. The conductive coupling consists of two contact carriers each of which is carried by a respective one of the wagons and in which along with a plurality of electrical contacts a light conductor is as well arranged. Of the two light conductors at least one is elastically biased so that the two light conductors are pressed against one another with their end faces when the contact carriers upon the coupling of the vehicles are moved against one another. Through these pressed together light conductors optical signals can be transmitted from one vehicle to the other.

In the case of such an optical signal coupling there however appear significant transmission failures. A reason for this lies in that the optical signals are heavily attenuated in their transmission from one light conductor to the other, both because of a dislocating movement as well as because of a tilting of the optical axes of the two light conductors relative to one another, which leads to a falsification of the optical signals. One such dislocating moment or such a tipping of the optical axes can however hardly be avoided in the case of vehicles which are coupled with one another, since the two coupling parts are not rigidly connected with one another and are relatively heavily mechanically stressed. Further reasons for an unreliable signal transmission lie in the sensitivity of such signal couplings to abrasion and contamination which, in view of the relatively rough conditions encountered in the use of vehicles, are likewise unavoidable.

To circumvent these problems an optical signal coupling is proposed in DE 29 22 937 C2 in which the light conductors are not pushed together at there end surfaces, and instead the light is transmitted with the help of lens pieces through the air from one light conductor to the other. Such a signal coupling is however relatively complicated and expensive and cannot offer the reliability which was expected of it.

In consideration of the above mentioned difficulties recently in DE100 52 020 A1 it has been proposed, in the case of applications under rough conditions, to do away entirely with a customary optical coupling of light conductors and instead of this to first convert the optical signals conducted in a first light conductor into electrical signals, to transmit these signals over customary electric couplings, to again convert the electrical signals into optical signals and to feed those optical signals into a second light conductor. With this solution, one loses above all the previously mentioned advantages of an optical signal coupling, namely the increased transmission bandwidth and a lower susceptibility to electromagnetic disturbing fields. Since however in the coupling regions of vehicles typically accompanying signals of high current are transmitted and thereby directly produce strong electromagnetic disturbing fields, it is not beneficial to replace the optical signal coupling by an electric coupling sensitive to the disturbing fields. Moreover, the coupling region of vehicles offers only a limited space for the signal coupling, so that optical signal couplings with their high transmission bandwidth are more efficiently used than electrical couplings.

The present invention has as its object the provision of an optical signal coupling which assures a reliable transmission of signals between vehicles coupled with one another.

SUMMARY OF THE INVENTION

This object is solved with an optical signal coupling of the previously mentioned kind in that the first coupling part includes a sending device which creates the optical signals to be transmitted, and the second coupling part includes a receiving device which detects the optical signals transmitted.

In contrast to customary signal couplings which essentially, with respect to their nature, represent the passive coupling of two light conductors, the signal coupling of the invention has active elements with the help of which the optical signals to be transmitted are produced only in the signal coupling and the transmitted optical signals are detected while still in the signal coupling.

Since the optical signals are intended to pass exclusively through the signal coupling they can be suited to the special optical characteristics of the signal coupling, so that the reliability of the signal transmission is substantially increased. If the signal coupling, for example as a result of contamination, abrasion, moisture or mechanical inaccuracies, produces a higher attenuation of the transmitted signals than expected, the signal created in the first coupling can be correspondingly strongly produced and the increased attenuation thereby compensated.

Actually, because of this compensation possibility a certain optical attenuation by the signal coupling is acceptable, which lowers the quality requirements for the optics of the signal coupling. Thereby manufacturing costs can be saved to an extent which more than equals the expense of the provision of the sending and receiving devices.

It is even possible to create optical signals in the first coupling part which are so strong that they can already be received by the second coupling part when the vehicles indeed stand close to one another, but are not yet coupled, so that the end faces of the light conducting elements are not yet engaged with one another. A signal transmission in the uncoupled condition can for example be useful during a coupling procedure in a curve. In this case information about the position of the wheels relative to the vehicle can be transmitted, which gives information about the curvature of the curve and thereby helps the positioning of the parts of the mechanical coupling for the coupling procedure.

In the transmission of a signal from one vehicle to the other the signal path in the usage of the signal coupling of the invention is constantly divided into three sections: a section from a signal source to the first coupling part, a section from the second coupling part to the signal goal, and an intermediate section in which the signal in the form of the optical signal produced in the sending device of the first coupling part passes through the signal coupling. If the signal arrives at the goal in faulty condition, it can be relatively easily determined in which of the three sections the source of the faults lies. For example, control signals can accompany the optical signals created in the sending devices, by means of which the receiving device can determine whether the correct signals have been transmitted. Moreover the signal can be refined in the sending and receiving devices so as to likewise increase the reliability of the signal transmission.

In the case of customary optical signal couplings, the disturbances accumulate in all three sections. Thereby not only slight transmission errors appear, but it is also difficult to determine in which sections of the signal path the origin for the disturbances lies, or to determine if perhaps a combination of disturbing sources is present and not only a single disturbing source as the reason for the errors.

A further advantage of the signal coupling of the invention lies in that it is more widely usable than customary ones. Whereas customary optical signal couplings, as mentioned, essentially serve to connect two light conductors provided in the coupled vehicles, with the signal coupling of the invention signals of general kind can be transmitted, that is independently of whether they are present in the individual vehicles as optical, electric, hydraulic or pneumatic signals. For in each case the signal (electric, optic, hydraulic or pneumatic) present in a vehicle is converted in the sending device of the first coupling part into an optical signal intended especially for passing through the optical signal coupling, which is detected by the receiving device of the second coupling part and which is then reconstructed as the original (electric, optic, hydraulic or pneumatic) signal and conducted on to the other vehicle.

Preferably, the first coupling part includes a microprocessor which controls the creation of the signals in the sending device. Additionally or alternatively, the second coupling part preferably contains a microprocessor which processes the signals detected in the receiving device. By the use of microprocessors for the signal production and the signal processing the reliability and flexibility of the optical signal coupling can be further increased. For with the help of the microprocessors the signals can among other things be tested and refined. Moreover, by means of the optical coupling signal two vehicles of differing constructional types can be connected wherein the signals are processed and/or conducted in different ways. The signal can then with the help of the microprocessors be conducted. The signals can with the help of the microprocessors already in the signal coupling be brought into the forms which are required by the individual vehicle.

In an advantageous development the microprocessor of the first coupling part is so programmed that it combines several individual signals into multiplexed signals, and the microprocessor of the second coupling part is so programmed that the multiplexed signals are divided into several individual signals. In this case several different signals can be transmitted by the signal coupling at the same time, so that additional signal couplings are spared.

In an advantageous further development of the optical signal coupling in each of the first and second coupling parts a light conducting element is contained of which one has a spherical concave end surface and the other a spherical convex end face with the same radius of curvature, with at least one of the elements being so elastically biased that the light conducting elements are pressed against one another with their end faces when the two vehicles are coupled with one another. In the coupled condition the convex end face of the one coupling part lies exactly matchingly in the concave end face of the other coupling part, and indeed without leaving an air gap between the end faces, which air gap would have an attenuating effect on the optical signal.

By way of the pressure force resulting from the biasing of the one or both light conducting elements, the convex end surface is pressed into the hollowing of the concave end face so that the two coupling parts are automatically centered with one another. Thereby with the signal coupling a mechanical displacement of the optical axes of the light conducting elements is avoided, which in the case of customary signal couplings leads to an attenuation of the optical signal.

Moreover, the spherical end faces allow a tilting of the optical axes of the light conducting elements relative to one another without the end faces being lifted from one another. In the case of such a tilting the spherical convex surface slides on the spherical concave surface, like a socket joint head in a socket joint socket, without producing an air gap between the end faces. This is a great advantage in comparison to customary signal couplings with flat end faces between which in the case of a tilting of the coupling parts relative to one another without fail an air gap is formed, which leads to a non-permissible attenuation of the transmitted signal.

The possibility of a small attenuation as a result of a tilting of the coupling parts relative to one another is especially of great significance if the signal coupling is used to transmit optical signals between rail vehicles. Although in the case of customary signal couplings for rail vehicles it is attempted to guide the coupling parts linearly, that is to prevent a tilting of the coupling relative to one another, this is not achieved reliably in practice because of the high mechanical loads, which leads to an excessive attenuation of the transmitted optical signals. With the described improved signal coupling the principal of a linear guiding can be entirely avoided, because even a relatively large tilting of the coupling parts relative to one another leads to a tolerable attenuation of the signals. The improved signal coupling is therefore to a given degree "bendable."

Preferably, the light conducting elements of the improved signal coupling each include a light opaque sleeve and a transparent core received in the sleeve. If the coupling parts are coupled, the light opaque sleeves form a light tunnel shielded from daylight. Thereby even in the case of a tilting of the light conducting elements relative to one another no daylight can fall into the transparent core, assuming that the wall thicknesses of the sleeves in the region of the end faces are not too small. Preferably these wall thicknesses have values which are at least 1/10 and preferably at least 1/5 of the radius of curvature of the end surfaces.

In a preferred further development the light opaque sleeves are electrically conducting and upon the pressing together of the end faces of the light conducting elements of the two coupling parts form an electrical contact between the associated sleeves through which electric signals are transmittable from one coupling part to the other coupling part. Thereby a second, independent channel for the transmission of signals is made which further increases the reliability of the optical signal coupling.

When the light conducting elements each comprise a light opaque sleeve and a transparent core, each associated spherical end face in the normal case has one section formed by the sleeve and another section formed by the transparent core. When the core and the sleeve for example have a cylindrical form the portion of the end face formed by the core has the shape of a ball segment, which in the normal case is smoothly continued by an annular section formed by the sleeve.

In the above-mentioned further development, in which the electric signal is transmitted through the sleeves, the section of the end face formed by the sleeve is preferably plated with hard gold to obtain a corrosion resisting contact.

To achieve a good electric contact between the sleeves, it is advantageous if the sleeve is allowed to extend somewhat beyond the transparent core. In this case the end surfaces, as the surfaces by which the light conducting elements engage one another, differ from the above described normal case in that they are only formed by the spherically formed sleeve end which has the shape of an annular spherical segment. Such a spherical section for this purpose of this description is also referred to as a "spherical surface." Accordingly the spherically shaped sleeve end is to be taken as a special case of the above mentioned "spherical end surface."

Preferably, at least a portion of the signal which is transmitted as an optical signal between the coupling parts is additionally transmitted as an electrical signal through the sleeves of the two coupling parts. In the event the transmission of the optical signal is disturbed or should entirely fail one has this otherwise redundant electrical signal in reserve. This doubled transmission in different ways is of a great importance in the case of safety relevant signals (for example braking signals in a connected train of vehicles), for which a fault containing or incomplete signal transmission must definitely be avoided.

Preferably, the first and/or second coupling part of the signal coupling has a housing on one axial end of which is formed a sleeve-like section in which the light conducting element is slidably supported and is elastically biased in a direction toward this one axial end, and at the other end of which a connecting pin is formed, which is designed for installation in a contact carrier.

When the sleeves of the light conducting elements are electrically conducting, there preferably exists between the sleeves of the light conducting elements and the sleeve-like section of the housing of one of those accompanying parts an electric sliding contact through which electric signals are transmittable. Then this housing can be used for the receiving and further conducting of the electric signals.

The connecting pin preferably comprises two sections insulated from one another of which one is connected with ground potential and the other with an electric signal conductor, when the connecting pin is installed in the contact carrier.

Optical signal couplings for vehicles usually are integrated into special conductor couplings, the halves of which have a small mechanical play. Since the described signal coupling however is much less sensitive to a displacement of the coupling parts relative to each other than is a normal coupling, a special conductor coupling for it is not absolutely necessary. Instead, the coupling parts can also be arranged directly into the coupling heads of a mechanical coupling. The play which typically appears between the coupling heads can be accommodated by the illustrated optical signal coupling without that play influencing its functioning.

The invention further concerns a conductive coupling for the connecting of conductors of two rail vehicles couplable with one another, with two contact carriers each of which is attached to a respective one of the rail vehicles, and with at least one signal coupling part with a sending device being arranged in one contact carrier and with at least one signal coupling part with a receiving device being arranged in the other contact carrier, which coupling parts together form an optical signal coupling of one of the above described kinds.

Preferably in this case in each contact carrier is arranged both a signal coupling part with a sending device and a signal coupling part with a receiving device which together form two optical signal couplings of the above described kind. Thereby from both the sides of the conductive coupling optical signals can be sent to the other side. In this case preferably the sending and receiving devices of the coupling parts of each contact carrier are connected with a common microprocessor which controls the creation of the signals in the sending device and processes the signals detected in the receiving device.

BRIEF DESCRIPTION OF THE DRAWINGS

Further features and advantages of the invention will be apparent from the following description in which the signal coupling is explained in more detail by way of an exemplary embodiment. The drawings are:

FIG. 3 is a sectional view of the coupling parts of FIGS. 1 and 2 in coupled condition, FIG. 4 shows the coupled coupling parts of FIG. 3, the spacing of which in the direction of the optical axis has been shortened, FIG. 5 shows the coupled coupling parts of FIG. 3, the optical axes of which have been tilted relative to one another, FIG. 6 is a functional sketch of a sending device of the first coupling part, FIG. 7 is a functional sketch of a receiving device of the second coupling part.

DETAILED DESCRIPTION OF THE PREFERRED EMBODIMENT

Figure 1:
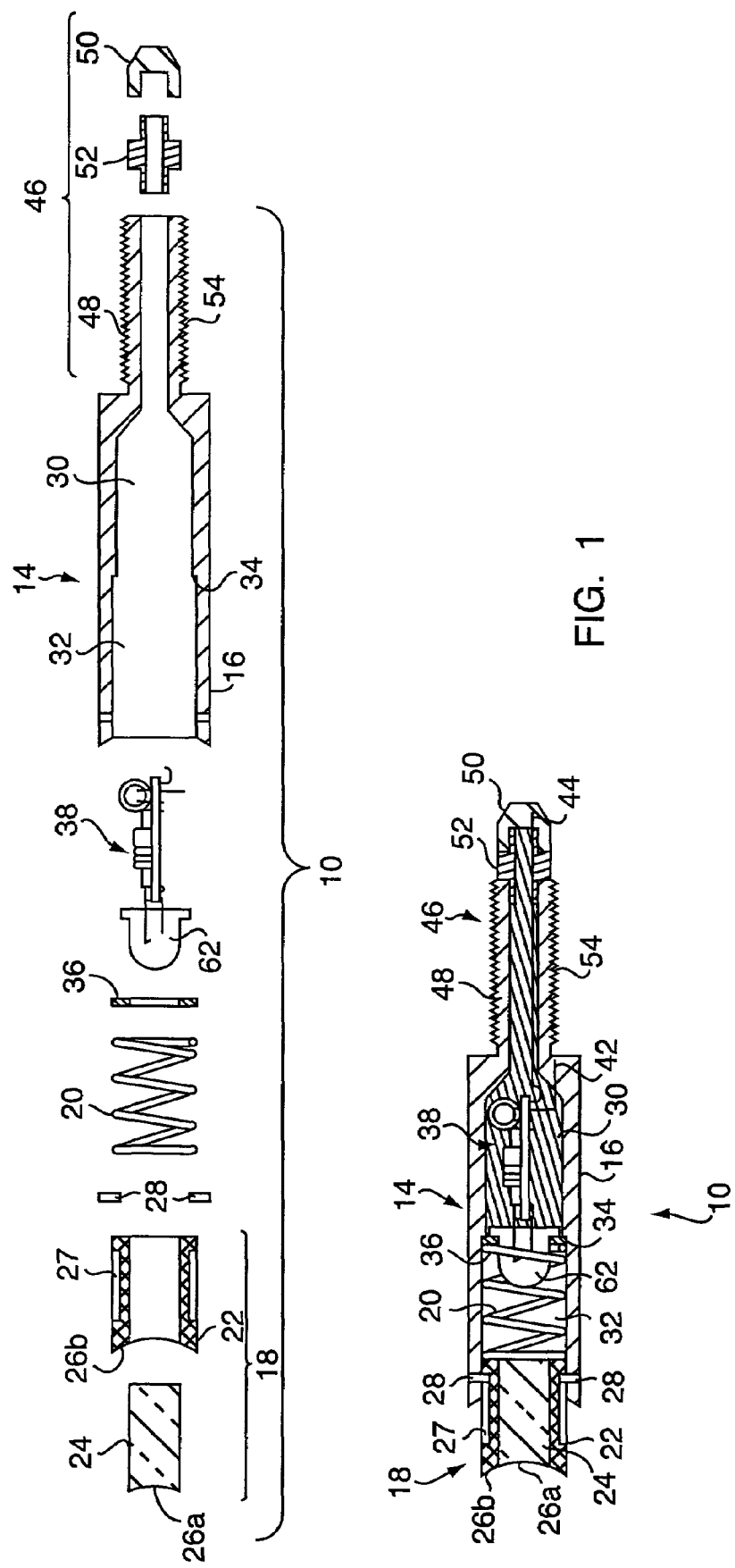
FIG. 1 is a sectional view of a first coupling part of a signal coupling in exploded illustration (upper) and in assembled condition (lower)
Figure 2:
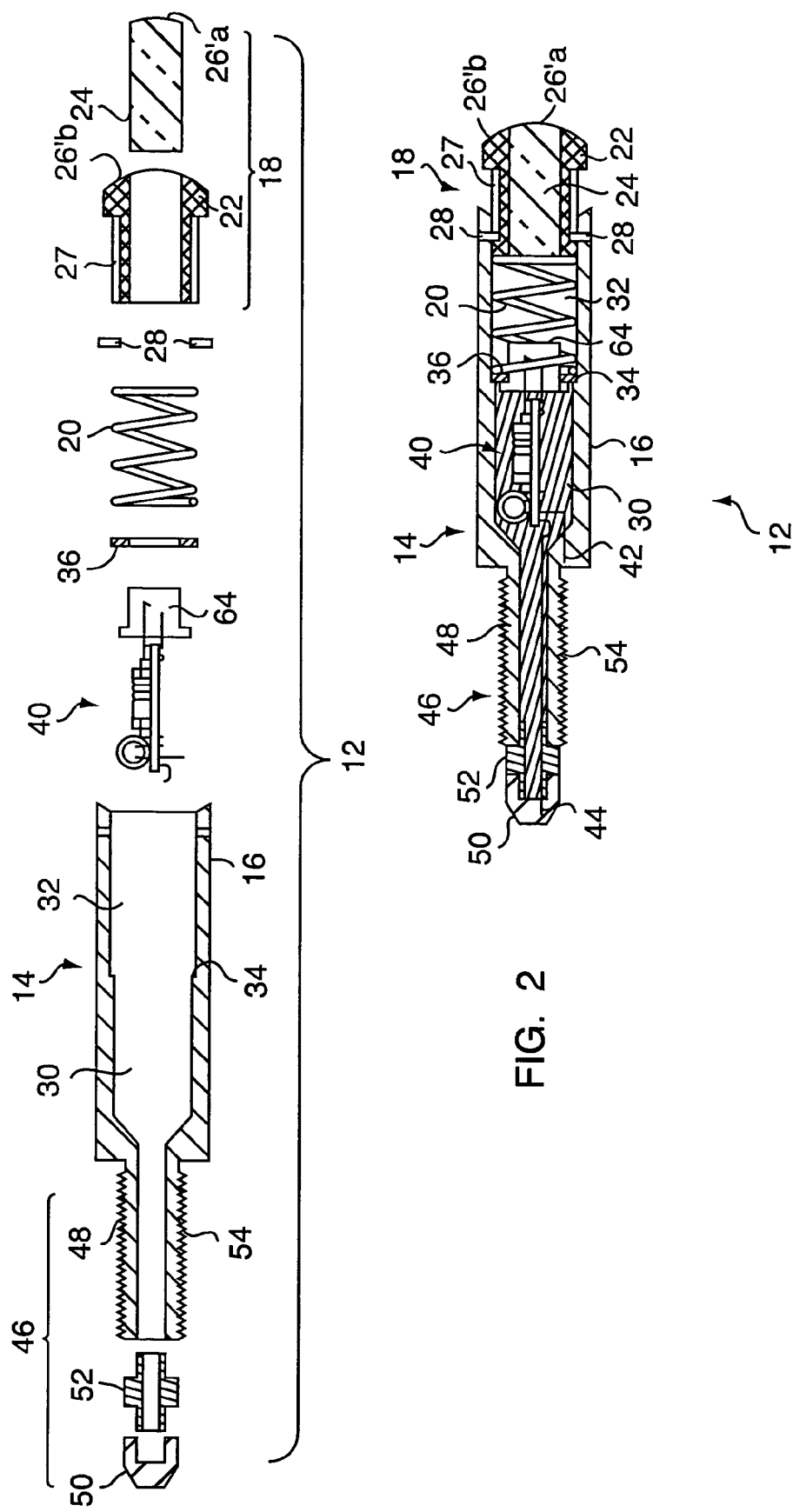
FIG. 2 is a sectional view of a second coupling part of a signal coupling in exploded illustration (upper) and in assembled condition (lower)

Shown in FIG. 1 is a longitudinal sectional view of the first coupling part 10 of a signal coupling according to a development of the present invention in exploded illustration (upper) and in assembled condition (lower). In FIG. 2 is shown a longitudinal sectional illustration of the second coupling part 12 of the same signal coupling in exploded illustration (upper) and in assembled condition (lower). Since the first and the second coupling parts 10 and 12 are identical in many features, they will be described in common in the following with similar parts being indicated by the same reference characters.

The coupling parts 10 and 12 each have a housing 14 with a sleeve-like section 16 in which a light conducting element 18 is axially slidably supported. The light conducting element 18 can be pressed into the sleeve-like section 16 of the associated housing 14 against the biasing force of a spring 20. In place of the spring 20, the light conducting element 18 can also be biased by a gas captured in the sleeve-like section 16. Each light conducting element 18 includes a light opaque sleeve 22 and a transparent core 24 received in the sleeve 22.

The light conducting element 18 of the first coupling part has a spherically concave end surface 26 facing away from the sleeve-like housing section 16 (FIG. 1), and the light conducting element 18 of the second coupling part 12 has a spherically convex end surface 26' (FIG. 2), the radius of curvature of which corresponds to that of the spherically concave end surface 26. The spherically concave end surface 26 and the spherically convex end surface 26' are formed not only in the transparent core 24 but are also continued in the axial ends of the associated sleeves 22 of the light conducting elements 18.

The spherical end surfaces 26 and 26' of the first and second coupling parts 10 and 12 have therefore a portion 26*a* and 26'*a* formed by the transparent core 24 and a portion 26*b* and 26'*b* formed by the sleeve 22. The sections 26*b* and 26'*b* are thereby annularly shaped spherical segments. However, in the following description such a spherical section is referred to as a "spherical surface."

Guide grooves 27 are formed in the sleeves 22, which guide grooves receive guide pins 28. The shifting movement of the light conducting element 18 is thereby limited by one of the ends of the guide groove 27 engaging a guide pin 28.

The inner space of the sleeve-like housing section 16 is made up of two cylindrical sections, one being an inwardly lying section 30 and the other being a more outwardly lying section 32, the diameter of which is larger than that of the inwardly lying section 30. Between the cylindrical inner space sections 30 and 32 is a shoulder 34 formed in the housing inner wall. In the outer inner space section 32 are located the light conducting element 18 and the spring 20, which spring at one end engages the light conducting element 18 and with its other end engages a metal ring 36 which in turn lies on the shoulder 34.

In the inner inner space section 30 in the case of the first coupling part 10 is a sending device 38 (FIG. 1) and in the case of the second coupling part is a receiving device of 40 (FIG. 2). Each of the sending device 38 and the receiving device 40 has a ground connection 42 which is soldered to the sleeve-like section 16 of the housing 14, and each has a signal terminal 44.

The housing 14 has at its end facing away from the light-conducting element 18 a hollow connecting pin 46 with a ground connector section 48, a signal connector section 50, and lying between them an insulating piece 52 which electrically isolates the sections 48 and 50 from one another. The signal connector 44 is guided through the hollow space of the connector pin 46 and is soldered with the signal connector piece 50. The inner inner space section 30 and the hollow space of the connector pin 46 are filled with pottant material illustrated in FIGS. 1 and 2 by cross hatching. An external thread 54 is formed on the ground connector section 48 of the connector pin 46 by means of which the coupling parts 10 and 12 are threadable into a ground potential socket of a contact carrier.

In FIG. 3 the first coupling part 10 and the second coupling part 12 are shown in coupled condition. In this condition, the end faces 26 and 26' of the associated light conductor elements 18 are pressed onto one another so that the optical signals which are fed into the transparent core 24 of the light conducting element 18 of the first coupling part 10 by the sending device 38 are transmitted through the end faces 26 and 26' into the transparent core 22 of the light conducting element 18 of the second coupling part 12 and become detected by the receiving device 40. Further, the light opaque sleeves 22 of the light conducting elements 18 form a light tunnel, shielded from daylight, which connects the sending device 38 and the receiving device of 40.

Since the two light conducting elements 18 are each slidable in the housing 14 of the associated coupling part 10 or 12 the coupling parts can be moved somewhat away from and toward one another without disturbing the functioning of the signal coupling. In FIG. 4, for example, the coupling parts 10 and 12 of FIG. 3 have been moved somewhat toward one another without that having changed the positions of the light conducting elements 18 to one another, so that the light transmission remains undisturbed. The illustrated signal coupling therefore assures a certain tolerance in the relative arrangement of the two coupling parts 10 and 12 in the coupling direction, that is along the optical axes of the light conducting elements 18, which optical axes are formed by the middle axes of the light conducting elements 18. Further, the spring pressure biased end faces 26 and 26' prevent displacement of the optical axes of the light conducting elements 18 against one another, that is they help to orient the coupling parts to one another and to maintain the oriented positions.

In FIG. 5, the two coupling parts 10 and 12 are likewise shown in coupled condition. Differently than in FIGS. 3 and 4, in this case the coupling parts 10 and 12 are not aligned with each other, but instead are tilted relative to one another. That means that the optical axes of the light conducting elements 18, each of which coincides with the symmetry axis of the associated transparent core 24, stand at an angle to one another. Because of their spherical shape, the end surfaces 26 and 26' nevertheless lie without gap on one another, so that the attenuation of the light upon passage through the end surfaces 26 and 26' is held within limit. The signal coupling is therefore bendable to a certain degree, without such bending influencing its function. This is a large advantage in comparison to customarily used flat end faces which upon such a bending become lifted from one another so that the light transmission from one coupling part to the other becomes heavily attenuated.

In FIG. 5, the signal coupling is shown in its maximally bent condition, in which the coupling parts are bent about 11° relative to one another. In the case of a further bending daylight would enter the light tunnel and falsify the optical signal. The limiting angle at which daylight penetrates into the light tunnel depends on the relationship of the wall thicknesses of the light opaque sleeves in the region of the end faces 26 and 26' to the radius of curvature of the end faces 26 and 26'. In the illustrated example, the wall thickness of the light opaque sleeve 22 of the first coupling part 10 in the area of the end face 26 is smaller than that of the light opaque sleeve 22 of the second coupling 12, and is therefore determinative of the value of the limiting angle. It measures about $\frac{1}{5}$ of the radius of curvature of the spherical end surfaces 26 and 26'.

As is to be taken from FIGS. 3 to 5, the two coupling parts 10 and 12 engage one another with their spherical end surface sections 26*b* and 26'*b* formed by the sleeves 22. Therefore electrical signals can be transmitted additionally through the two sleeves 22 between the two coupling parts 10 and 12 insofar as these sleeves are made to be electrically conducting. The end surface sections 26*b* and 26'*b* are then preferably plated with hard gold.

By way of the additional transmission possibility for electrical signals the reliability of the signal transmission can be further increased. Especially as a safety reserve, it is advisable to transmit the optical signals, or the most important portion of them, additionally as "redundant" electrical signals through the sleeves 22. To deliver the electrical signals to the sleeves 22 and to again conduct them away from the sleeves, in a modification of the coupling (not shown in the figures) the signals can be conducted through the housing 14, which in this case differs from that illustrated in FIGS. 1 to 5 by not being connected to ground. Between the sleeve-like housing section 16 and the sleeves 22 a sliding contact (not shown) can then be used.

FIG. 6 shows a functional sketch of the sending device 38. As is to be taken from this, an input voltage Vin is applied between the ground connection 42 and the signal connection 44 through a scaling resistor 56 and is applied through a high pass filter, consisting of a capacitor 58 and a resistor of 60, to a light emitting diode 62, which emits light corresponding to the applied voltage. The relationship between the applied voltage Vin and the radiated power S of the light emitting diode 62 is schematically represented in the diagram in the right portion of FIG. 6, whose abscissa indicates time and whose ordinate gives the input voltage Vin and the radiation power S in undefined units.

FIG. 7 shows functional sketch of the receiving device 40. The receiving device 40 includes a photodiode 64 which in dependence on the intensity of the incoming light produces a voltage. This voltage is suitably amplified in a first circuit section with the help of an operational amplifier 66, a resistor 68, and a capacitor 70, and is inverted with the help of a further operational amplifier 72 to an output voltage Vout. The relation between the received emission power S' (which multiplied by an attenuation factor corresponds to the radiation power emitted from the LED 62) and the output signal Vout of the receiving device 40 is schematically illustrated in the diagram in the right portion of FIG. 7, the abscissa of which again shows time and the ordinate of which shows the received emission power S' and the output voltage Vout in undefined units.

The sending device 38 and the receiving device 40 are so designed that the output signal Vout of the receiving device 40 despite a possible attenuation of the transmitted optical signal corresponds to the input voltage Vin. Therefore, even if the optical signal transmitted between the coupling parts 10 and 12 is subjected to a certain attenuation, the effective transmitted electric signal Vout is not attenuated in respect to the original signal Vin.

The electric input signal Vin can for example be an electrical high frequency signal which inside of two vehicles is conducted through a co-axial cable and only to suit the signal coupling is converted into an optical signal with the help of the sending device 38. The signal coupling with the active elements 38 and 40, however, finds for example other uses if in the vehicle optical signals are already transmitted through light conductors. These signals are then in the first coupling part 10 first converted to an electric signal which is then applied to the sending device 38. The output signal Vout of the receiving device 40 is then in the second coupling part again converted into an optical signal and supplied to a subsequent light conductor.

Figure 8:
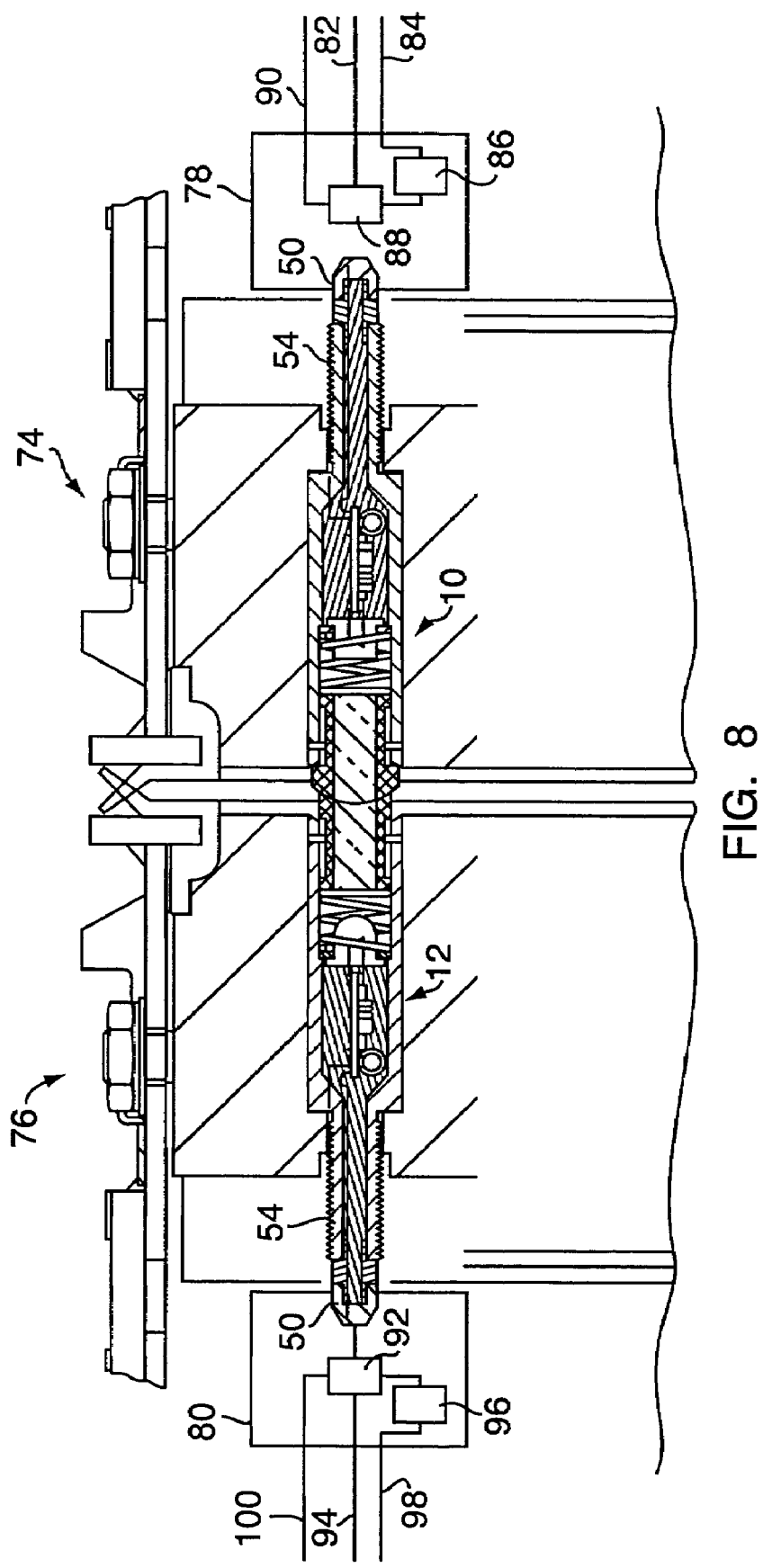
FIG. 8 is a sectional view of a portion of a conductor coupling for rail vehicles with two contact carriers, in each of which a coupling part of the signal coupling is used.

FIG. 8 shows in sectional illustration a section of a light coupling for use in combination with an automatic rail vehicle coupling. An automatic rail vehicle coupling is used if the towed members have to be often coupled and de-coupled. Then the associated conductive coupling is so designed that its electrical and optical contacts are likewise automatically coupled along with the automatic coupling of the towed members.

The conductive coupling includes two contact carriers 74 and 76 in which, along with a row of electrical contacts (not shown) the above-described coupling parts 10 and 12 of the signal coupling are also used. The coupling parts at 10 and 12 are forwardly threaded into the contact carriers 74 and 76 by means of the threads 54 of the connector pins 46, whereby the thread 54 is subjected to ground potential. At the same time, the signal contact section 50 of the first coupling part 10 comes into electrical contact with a schematically illustrated first signal processing unit 78 and the signal connector section 50 of the second coupling part 12 comes into electric contact with a schematically illustrated second signal processing unit 80.

It will be understood that the coupling parts 10 and 12 are very easily installable and removable. This provides a big advantage in comparison to customary optical signal couplings whose coupling parts are connected with light conductors and can only be installed or exchanged with great difficulty, and especially not from the forward ends of the contact carriers 74 and 76.

In the illustrated exemplary embodiment the first signal-processing unit 78 is supplied with electric signals over a co-axial cable 82 and optical signals over a light conductor 84. The optical signals of the light conductor 84 are converted into electrical signals in a converter unit 86 and together with the electrical signals of the electrical conductor 82 are delivered to a control unit 88. In the control unit 88 the two inputted electrical signals are processed into a multiplexed signal which is transmitted to the signal connector 50 of the first coupling part. For this the control unit 88 has a microprocessor (not shown), which includes an industrial PC or a so-called field programmable gate array (FPGA). In comparison to customary microprocessors an FPGA has the advantage that it can process several commands simultaneously as is required for a genuine multi-tasking in the involved circumstances.

The control unit 88 is further connected with a data-conductor 90 over which further information for the signal processing can be delivered. For example, through the data conductor 90, it can be signaled that already transmitted signals have not been completely received and should be sent again.

The conversion of the electric multiplexed signals into optical signals by the sending device 38 and their transmission from the first coupling part 10 to the second coupling part 12 takes place in the way described above. From the signal connector 50 of the second coupling part 12, the electrical signals created in the receiving device 40 reach a control unit 92 of the second signal-processing unit 80. In the control unit 92 the multiplexed signals are divided into individual signals. The original ingoing signals from the electric conductor 82 are further conducted by an electrical conductor 94. The original ingoing signals from the light conductor 84 are converted again into optical signals in a converter unit 96 and are supplied to a light conductor 98.

By means of a further data conductor 100 signals from the control unit 92 can be further conducted, for example fault reports if signal errors have been received. The control unit 92 contains likewise an industrial PC or an FPGA (not shown).

The signal processing units 78 and 80 can also be contained in the housings 14 of the coupling parts 10 and 12. Further, the signal processing units 78 and 80 can each be connected with a transmission capable coupling part (similar to the first coupling part 10) and a receiving capable coupling part (similar to the second coupling part 12). Then, signals can be transmitted from both sides of the coupling to the other side and the signal processing units of 78 and 80 can communicate with one another in both directions.

The coupling parts 10 and 11 can above all be not only arranged in special contact carriers as shown in FIG. 8, but can also be arranged in the coupling heads of a mechanical rail vehicle coupling, for example in an automatic intermediate buffer coupling (not shown). The above described insensitivity of the optical signal coupling with respect to mechanical tolerances makes this arrangement possible, which would not function in the case of a customary optical signal coupling. Thereby in many cases a separate conductor coupling can be spared.

What is claimed is:

1. An optical signal coupling for two vehicles coupled with one another, especially rail vehicles coupled with one another, with a first coupling part fixed to one vehicle and a second coupling part fixed to the other vehicle, between which optical signals are transmitted, the first coupling part containing a sending device which creates the optical signals to be transmitted, and the second coupling part containing a receiving device which detects the transmitted optical signals;

the first and second coupling parts each being a light conducting element of which elements one has a spherically concave end surface and the other has a spherically convex end surface with an identical radius of curvature and of which at least one is so elastically biased that the light conducting elements are pressed against one another with their end surfaces when the two vehicles are coupled with one another, the light conducting elements each including a light opaque sleeve and a transparent core received in the sleeve, the light opaque sleeves being electrically conducting and in that upon the pressing together of the end surfaces the light conducting elements of the first and second coupling parts establish an electrical contact between the associated sleeves through which electric signals from one coupling part can be transmitted to the other coupling part.

2. An optical signal coupling according to claim 1, wherein the section of each sleeve which is part of the end surfaces is plated with hard gold.

3. An optical signal coupling according to claim 1, wherein at least a portion of the signal which is transmitted between the coupling parts as an optical signal is additionally transmitted through the sleeves of the two coupling parts as an electric signal.

4. An optical signal coupling according to claim 1, wherein between the sleeve of the light conducting element and the sleeve-like section of the housing of each coupling part an electrical sliding contact exists through which electric signals are transmittable between the sleeve-like section and the sleeve.

5. An optical signal coupling for two vehicles coupled with one another, especially rail vehicles coupled with one another, with a first coupling part fixed to one vehicle and a second coupling part fixed to the other vehicle, between which optical signals are transmitted, wherein the first coupling part contains a sending device which creates the optical signals to be transmitted, and the second coupling part contains a receiving device which detects the transmitted optical signals;

in each of the first and second coupling parts, is a light conducting element, of which at least one is so elastically biased that the light conducting elements are pressed against one another with their end surfaces, when the two vehicles are coupled with one another, each of the light conducting elements includes a light opaque sleeve and a transparent core received in the sleeve, the light opaque sleeves are electrically conducting and upon the pressing together of the end surfaces, the light conducting elements of the first and second coupling parts establish an electrical contact between the associated sleeves, through which electric signals from one coupling part can be transmitted to the other coupling part.

6. An optical signal coupling according to claim 5, wherein the first coupling part includes a microprocessor which controls the creation of the signals in the sending device.

7. An optical signal apparatus according to claim 6, wherein the microprocessor of the first coupling part is so programmed that it merges several individual signals into multiplexed signals and the microprocessor of the second coupling part is so programmed that it divides the multiplexed signals into several individual signals.

8. An optical signal coupling according to claim 5, wherein the second coupling part includes a microprocessor which processes the signals detected in the receiving device.

9. An optical signal coupling according to claim 5, wherein the sending device has at least one LED for creating the optical signal.

10. An optical signal coupling according to claim 5, wherein the receiving device has a photo diode for detecting the optical signal.

11. An optical signal coupling according to claim 5, wherein one of said end surfaces is formed as a spherically concave surface and the other end surface is formed as a spherically convex surface.

12. An optical signal coupling according to claim 11, wherein the wall thicknesses of the sleeves in the region of the end surfaces have a value equal to at least $\frac{1}{10}$, and preferably of at least $\frac{1}{5}$, of the radius of curvature of the end surfaces.

13. An optical signal coupling according to claim 11, wherein the section of each sleeve which is part of the end surfaces is plated with hard gold.

14. An optical signal coupling according to claim 5, wherein at least a portion of the signal which is transmitted between the coupling parts as an optical signal is additionally transmitted through the sleeves of the two coupling parts as an electric signal.

15. An optical signal coupling according to claim 5, wherein each of the first and second coupling parts has a housing on one axial end of which a sleeve-like section is formed in which the light conducting element is axially slidably supported and is elastically biased in the direction toward the one axial end, and at the other end of which a connector pin is formed which is designed for placement in a contact carrier.

16. An optical signal coupling according to claim 15, wherein the connection pin comprises two sections insulated from one another of which one is connected with ground potential and the other of which is connected with an electric signal conductor when the connecting pin is installed in the contact carrier.

17. An optical signal coupling according to claim 5, wherein between the sleeve of the light conducting element and the sleeve-like section of the housing of each coupling part an electrical sliding contact exists through which electric signals are transmittable between the sleeve-like section and the sleeve.

18. An optical signal coupling according to claim 5, wherein the coupling parts are arranged in the coupling heads of a mechanical coupling for rail vehicles.

19. A conductive coupling for the connection of conductors of two rail vehicles couplable with one another, with two contact carriers each of which is connected to a respective one of the rail vehicles, wherein at least one signal coupling part with a sending device is arranged in one contact carrier and wherein at least one signal coupling part with a receiving device is arranged in the other contact carrier which coupling parts together form an optical signal coupling according to claim 5.

20. A conductive coupling according to claim 19, wherein in each contact carrier is arranged both a signal coupling part with a sending device and a signal coupling part with a receiving device of which coupling parts together form two optical signal couplings.

21. A conductive coupling according to claim 20, wherein the sending device and the receiving device of the coupling parts of each contact carrier are connected with a common microprocessor which controls the generation of the signals in the sending device and processes signals detected in the receiving device.

* * * * *